(12) United States Patent
Nguyen et al.

(10) Patent No.: US 6,915,146 B1
(45) Date of Patent: Jul. 5, 2005

(54) METHOD AND APPARATUS FOR RECEIVING A PLURALITY OF DIFFERENT CODES AT A PLURALITY OF DIFFERENT FREQUENCIES

(75) Inventors: Hung Nguyen, Patchogue, NY (US); Bernard Wojciak, Naperville, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 09/557,690

(22) Filed: Apr. 25, 2000

(51) Int. Cl.[7] .................................................. H04B 1/10
(52) U.S. Cl. .................... 455/702; 455/176.1; 455/227; 455/334; 340/5.71; 340/825.72
(58) Field of Search ........................... 455/702, 176.1, 455/178.1, 188.1, 227, 229, 267, 334, 343, 703, 127; 340/5.1, 5.2, 5.7, 5.71, 825.69, 825.72, 5.61–5.64

(56) References Cited

U.S. PATENT DOCUMENTS

| | | | | |
|---|---|---|---|---|
| 3,746,999 A | * | 7/1973 | Freen | 455/334 |
| 4,878,052 A | * | 10/1989 | Schulze | 340/825.69 |
| 5,252,960 A | * | 10/1993 | Duhame | 340/5.64 |
| 5,262,769 A | * | 11/1993 | Holmes | 340/7.42 |
| 5,550,520 A | * | 8/1996 | Kobayashi | 333/213 |
| 5,680,134 A | * | 10/1997 | Tsui | 341/173 |
| 5,790,948 A | * | 8/1998 | Eisfeld et al. | 455/352 |
| 5,907,795 A | * | 5/1999 | Hwang | 340/7.33 |
| RE36,703 E | * | 5/2000 | Heitschel et al. | 700/90 |
| 6,249,673 B1 | * | 6/2001 | Tsui | 455/92 |
| 6,486,795 B1 | * | 11/2002 | Sobel et al. | 340/825.72 |
| 6,567,012 B1 | * | 5/2003 | Matsubara et al. | 340/825.72 |

* cited by examiner

Primary Examiner—William Trost
Assistant Examiner—Sharad Rampuria
(74) Attorney, Agent, or Firm—Fitch, Even, Tabin & Flannery

(57) ABSTRACT

A receiver capable of receiving a plurality of different codes at a plurality of different frequencies is set forth herein. The receiver offers digital frequency control by using a controller driven signal diode to add or remove capacitance to or from a band pass filter circuit, thereby altering the frequency the bandpass filter is setup to receive. Input devices allow the receiver code, bit pattern, and relay output to be selected among a plurality of different codes, bit patterns, and relay output types. The receiver processes the selections, determines what frequency receiver actuation signal is to be received, and alters the bias of the signal diode to adjust the bandpass filter frequency accordingly.

9 Claims, 13 Drawing Sheets

| FIG. 3A | FIG. 3B | FIG. 3C |

METHOD AND APPARATUS FOR RECEIVING A PLURALITY OF DIFFERENT CODES AT A PLURALITY OF DIFFERENT FREQUENCIES

BACKGROUND OF THE INVENTION

This invention relates generally to radio frequency (RF) receivers and more particularly concerns RF receivers capable of receiving a plurality of different codes at a plurality of different frequencies.

Transmitters and receivers are becoming more and more widely used to control the operation of an ever increasing amount of devices and systems. Originally used for military applications and large-scale broadcasting needs, transmitters and receivers have evolved to such an extent that they are now being used in applications as personal as medical implants. In fact it is becoming almost impossible to go a day without using a device that operates via a transmitter and receiver. For example, our cars, garages, shutters, etc. are all offering control via transmitters and receivers. Every day new systems are being designed to take advantage of the mobility transmitters and receivers offer and the ease with which they make even the most tedious of tasks.

As such, there is currently available a wide variety of transmitters and receivers made by numerous manufacturers. Typically each manufacturer's transmitters and/or receivers operate via codes and frequencies unique to that individual manufacturer. Unfortunately, like all electronics, transmitters and receivers can break and/or become damaged. When this happens, it often becomes necessary to purchase replacement parts. However, since most manufacturers build their products to operate via codes and frequencies unique to themselves, consumers are stuck having to buy replacement parts from the original manufacturer. This limits competition and can often make the cost of the replacement part much higher then it would be if other suppliers were available. In some industries, universal transmitters are offered for sale which can be used on a variety of products made by a variety of manufacturers. For example, in the garage door operator industry, there are several universal transmitters that are capable of operating a variety of door receivers.

Although several universal transmitters are available and help increase competition and/or the number of available suppliers of replacement parts, there are no such alternatives for receivers. If a receiver breaks or is damaged to the extent it needs to be replaced, the user would have to go and purchase an entirely new system or buy a replacement unit from the same manufacturer of his or her old receiver. This may not always be convenient and could be cost prohibitive.

Receivers that are capable of receiving a plurality of different codes at a plurality of different frequencies would not be limited to use as replacement parts. Indeed many service personnel who both install and repair movable barrier operators would prefer carrying such a receiver because it would reduce the need for having several different brands of receivers in their inventory. In addition, it would reduce the number of receivers the service personnel would need to learn how to operate. The mere fact they would be able to buy a larger quantity of receivers from one manufacturer may also allow them a reduced price per unit or price break of some type.

Accordingly, there is a need for a receiver capable of receiving a plurality of different codes at a plurality of different frequencies. There is also a need for a sensitive receiver that can offer these capabilities at relatively low current. There is a further need for a receiver that can offer these capabilities without amplifying unwanted signals resulting from switching in a high gain RF amplifier circuit.

SUMMARY OF THE INVENTION

A RF receiver embodying the present invention is capable of receiving a plurality of different codes at a plurality of different frequencies. More particularly the RF receiver offers digital frequency control by using a controller driven signal diode to add and/or remove capacitance to and/or from a band pass filter circuit. The RF receiver comprises a front end matching antenna for receiving analog RF input and a low gain amplifier coupled to a tunable bandpass filter. The tunable bandpass filter and low gain amplifier are in turn coupled to a super-regenerative amplifier which increases the sensitivity of the receiver and reduces the amount of current drawn by the component. The super-regenerative receiver is coupled to an active filter which supplies a digital signal to the microprocessor or controller of the receiver circuit.

The receiver has various inputs capable of selecting what type of code (or manufacturer's signal) is to be received by the receiver and selecting the bit pattern that is to be received. In addition, relay mode inputs are provided that allow selection between momentary and continuous operation. If momentary operation is selected the receiver will operate upon receipt of a single receiver actuation signal. However if continuous operation is selected the receiver will output only for as long as receiver actuation signals are continuously received.

Once the type of code selection has been made, the controller determines what frequency the tunable bandpass filter should be set to receive. The controller accomplishes this by forward or reverse biasing a signal diode that is connected to additional capacitance and/or circuitry. When the controller forward biases the signal diode, additional capacitance is placed in parallel with the existing capacitance of the bandpass filter and the filter is set to receive a smaller frequency. When the controller reverse biases the signal diode, the additional capacitance is almost completely removed from the bandpass filter and a larger frequency is set to be received. More particularly, the signal diode of the bandpass circuitry acts as a solid state switch switching among a variety of frequency circuits. Additional signal diodes and the use of tunable components such as tunable inductors and tunable capacitors allow for additional frequencies to be received by the receiver.

DETAILED DESCRIPTION OF THE PREFERRED EMBODIMENT

Figure 1:
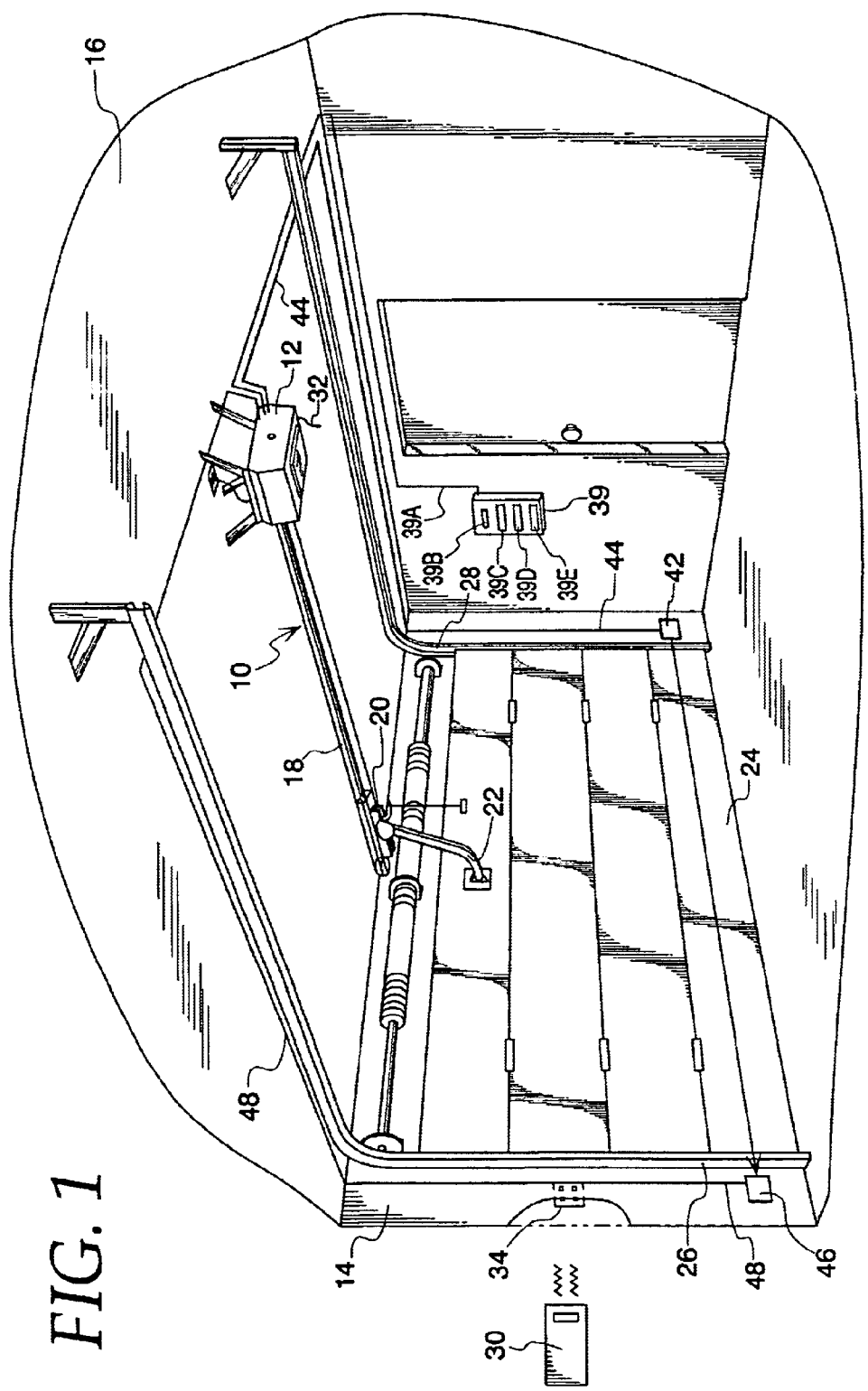
FIG. 1 is a perspective view of an apparatus for moving a barrier or garage door embodying the present invention.

Referring now to the drawings and especially to FIG. 1, a movable barrier operator embodying the present invention is generally shown therein and identified by reference numeral 10. The movable barrier operator 10 includes a head unit 12 mounted within a garage 14 and is employed for controlling the opening and closing of garage 14. More specifically, the head unit 12 is mounted to the ceiling 16 of the garage 14 and includes a rail 18 extending therefrom with a releasable trolley 20 attached having an arm 22 extending to a multiple paneled garage door 24 positioned for movement along a pair of door rails 26 and 28. The movable barrier operator 10 transfers the garage door 24 between the closed position illustrated in FIG. 1 and an open or raised position, allowing access to and from the garage 14.

The system includes a hand-held transmitter unit 30 adapted to send signals to an antenna 32 positioned on or extending from the head unit 12 and coupled to a receiver 50 (see FIG. 2) located within the head unit 12. The receiver 50 is capable of receiving a plurality of different frequencies as a plurality of different frequencies, as will be discussed in more detail hereinafter. An external control pad 34 is positioned on the outside of the garage 14 having a plurality of buttons 35 thereon and communicates via radio frequency transmission with the antenna 32 and receiver 50 of the head unit 12. A switch module 39 is mounted on a wall of the garage 14. The switch module 39 is connected to the head unit 12 by a pair of wires 39a. The switch module 39 includes a learn switch 39b, a light switch 39c, a lock switch 39d and a command switch 39e.

An optical emitter 42 and an optical detector 46 are coupled to the head unit 12 by a pair of wires 44 and 48, respectively. The emitter 42 and detector 46 are used to satisfy the requirements of Underwriter's Laboratories, the Consumer Product Safety Commission and the like which require that garage door operators sold in the United States must, when in a closing mode and contacting an obstruction having a height of more than one inch, reverse and open the door in order to prevent damage to property and injury to persons.

Figure 2:
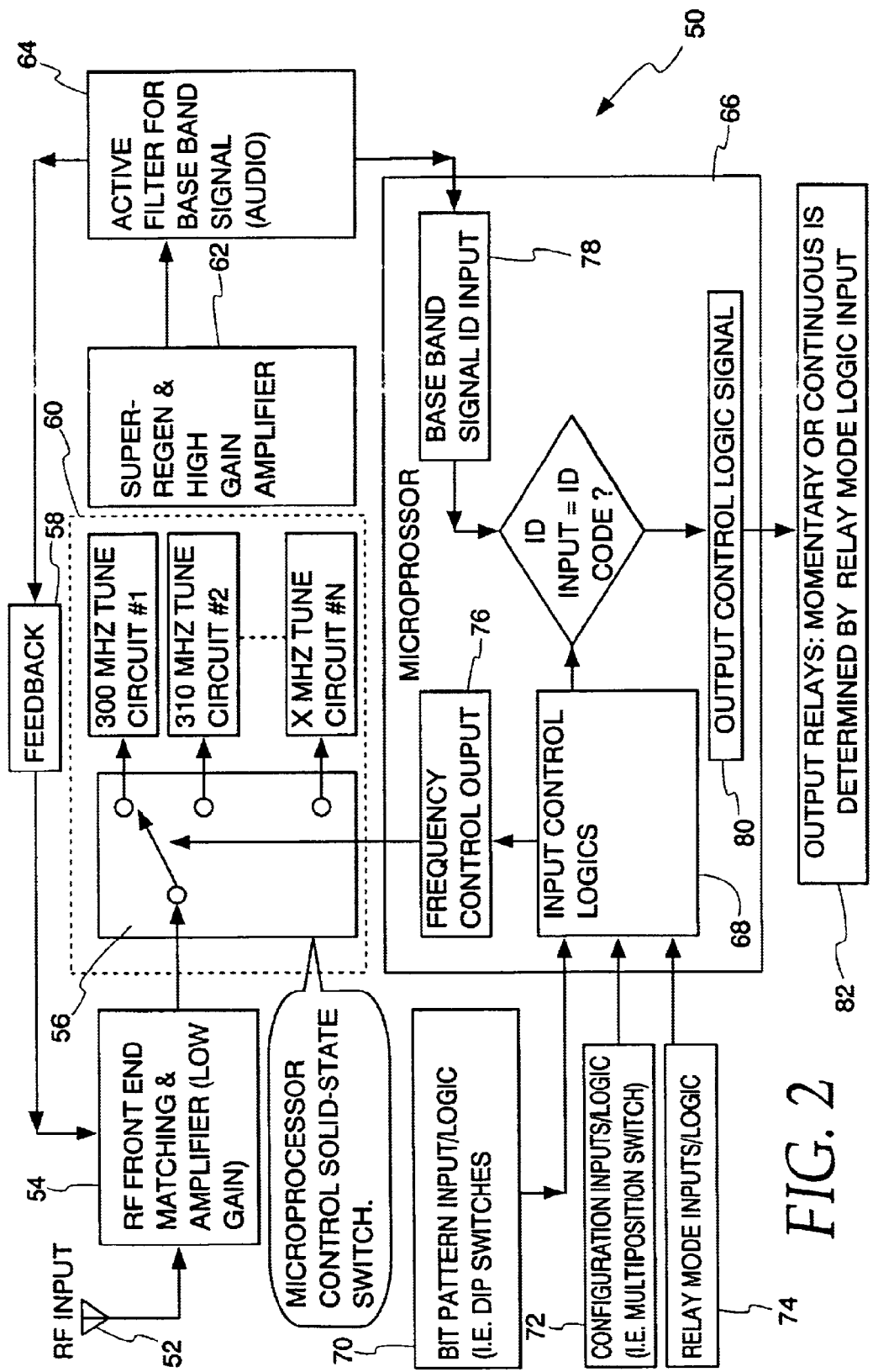
FIG. 2 is a block diagram of a receiver embodying the present invention.

Referring now to FIG. 2, in which a block diagram of the receiver 50 is shown, the receiver 50 includes an antenna 52 coupled to a front end matching and low gain amplifier circuitry 54. The antenna 52 receives a RF signal from a transmitter. The front end matching and amplifier circuitry 54 are in turn coupled to a microprocessor or controller controlled solid state selector circuit switch 56 and feedback circuitry 58. The selector circuit 56 determines what frequency receiver 50 will be resonant for, (i.e., 300 MHz, 310 MHz, n MHz), and connects the appropriate circuitry to the band pass filter 60 for receiving this frequency. As will be discussed further below, this can be achieved by using signal diodes to add/remove discrete components to and from a bandpass filter. The bandpass filter 60 is coupled to a super-regenerative high gain amplifier 62 which in turn is coupled to the feedback circuitry 58 and an active filter 64 for filtering a base band signal. The active filter has an operating bandwidth range of 2 kHz centered at approximately 1 kHz (making it within audio range of bandwidth).

The active filter 64 supplies a digital signal to microprocessor or controller 66. Input logic 68 of controller 66 reads the settings of the bit pattern inputs 70, the configuration inputs 72, and the relay mode inputs 74. The configuration inputs 72 determine what type of code will actuate the receiver, (i.e., manufacturer A's code, B's code, C's code, etc.). The relay mode inputs 74 determine whether the receiver will output based on receipt of a momentary input or a continuous input. If momentary input is selected the controller will output to the transmitter output relays upon receiving a single signal, (i.e., the transmitter button must only be pressed once to make receiver operate). If continuous input is selected the receiver will output upon receiving a actuation signal (i.e., the transmitter button must be held down to keep receiver operating). The bit pattern inputs 70 determine what bit pattern the incoming signal must have in order to operate the receiver. The controller 66 stores the configuration and bit pattern in a registry.

The frequency control output 76 of controller 66 determines what frequency matches the configuration selected and adjusts the selector 56 accordingly. For example, if manufacturer A's code is transmitted at a frequency of 310 MHz and has been selected by the configuration input 72, the frequency control output 76 directs the solid state switch 56 to switch from the 300 MHz tuning circuit (as shown in FIG. 2) to the 310 MHz tuning circuit so that the receiver 50 is set to receive a 310 MHz signal.

The base band signal input 78 of controller 66 receives the digital signal leaving the active filter 64. The controller 66 then compares the digital input received to the configurations and bit patterns selections stored in the controller 66 to determine if the received signal is the signal the receiver 50 has been programmed for, (i.e., determines if a good packet has been received). If the received signal is not the signal the receiver 50 has been programmed for, the receiver ignores the signal and will not respond. However, if the received signal matches the signal the receiver 50 has been programmed for, then the output control logic signal 80 of controller 66 turns on the output relays 82 for an amount of time specified by the relay mode input 74, (i.e., continuous or momentary).

Figure 3A:
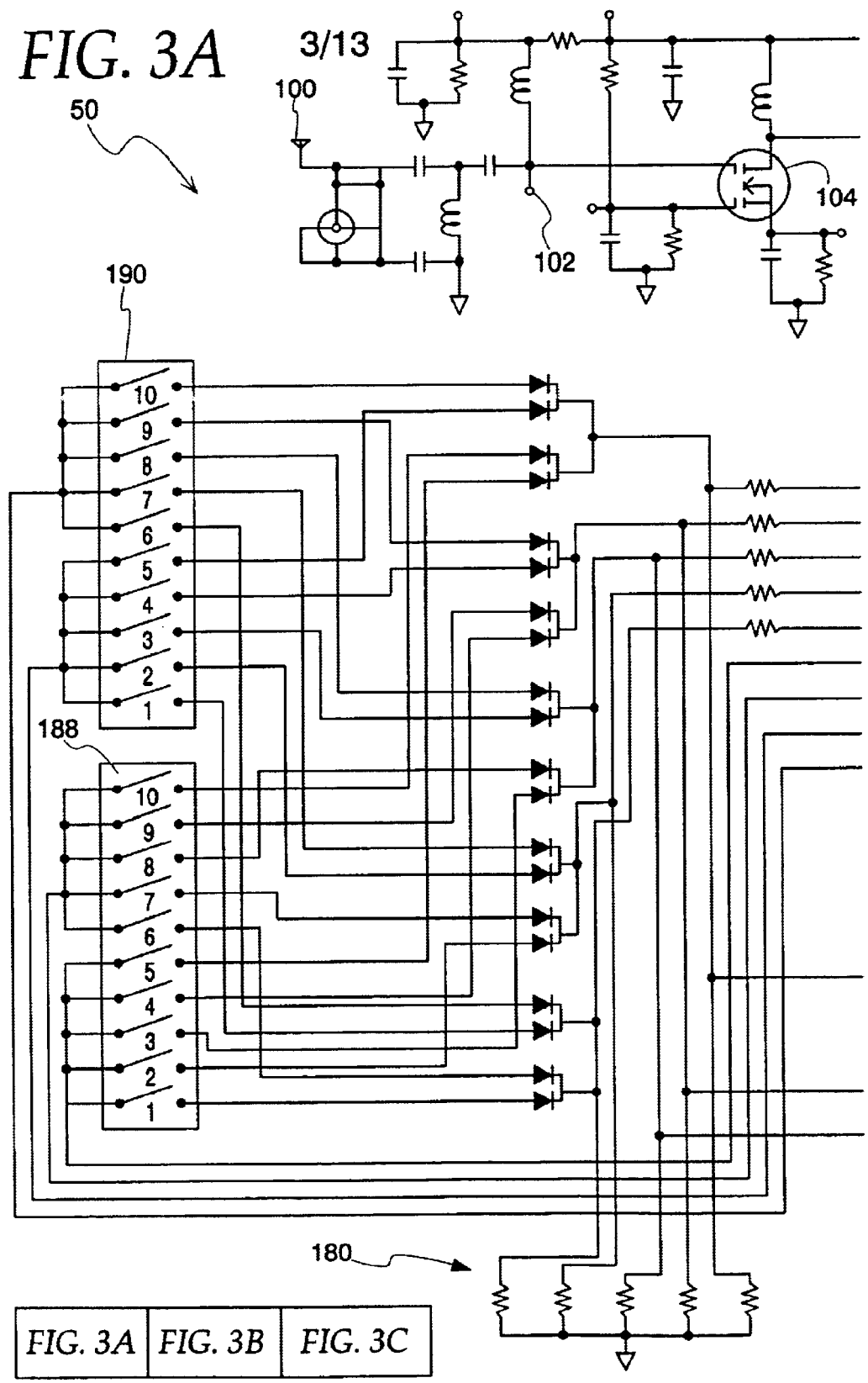
FIG. 3 is a schematic of the receiver shown in FIG. 2.
Figure 3B:
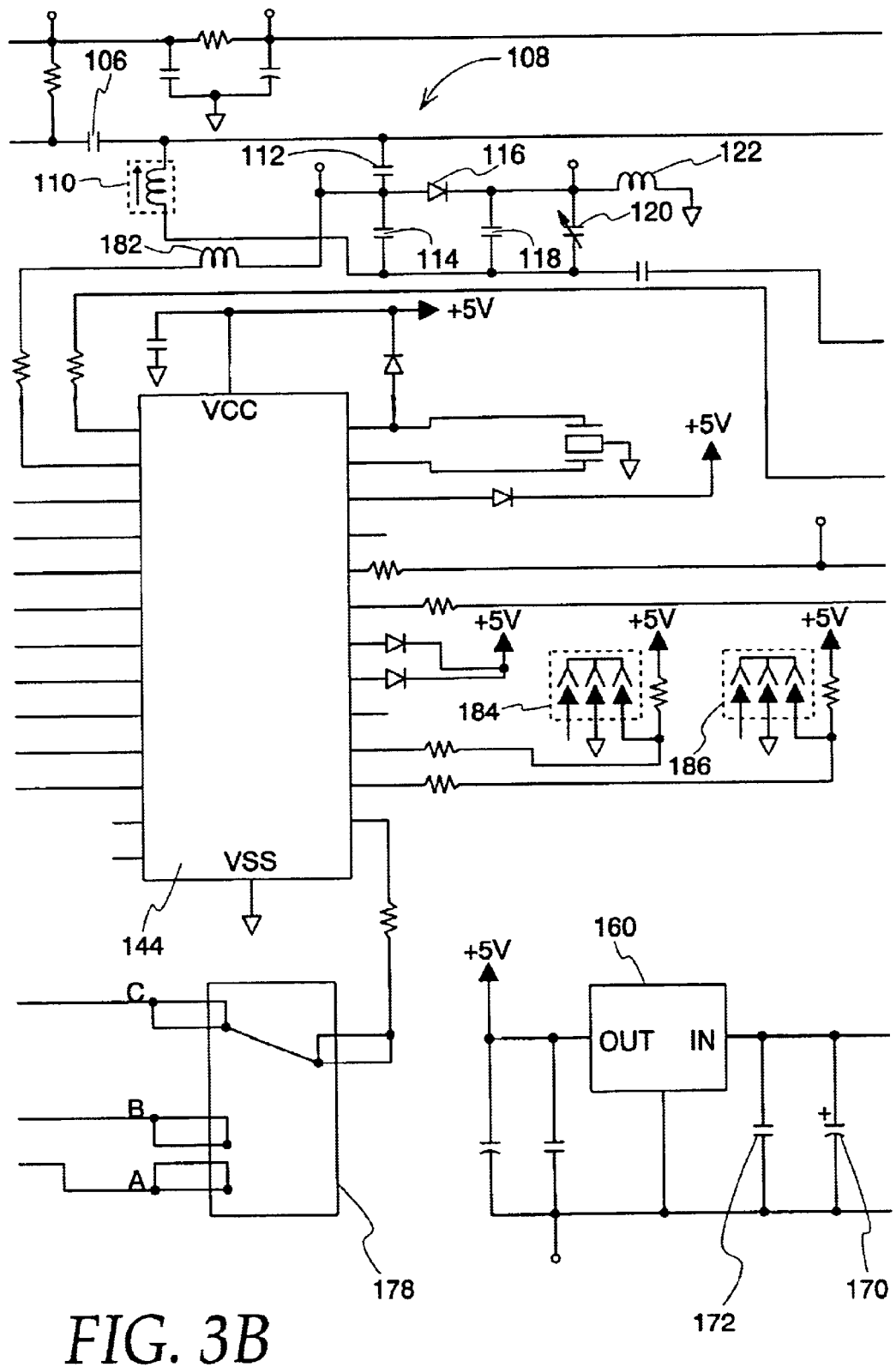
Figure 3C:
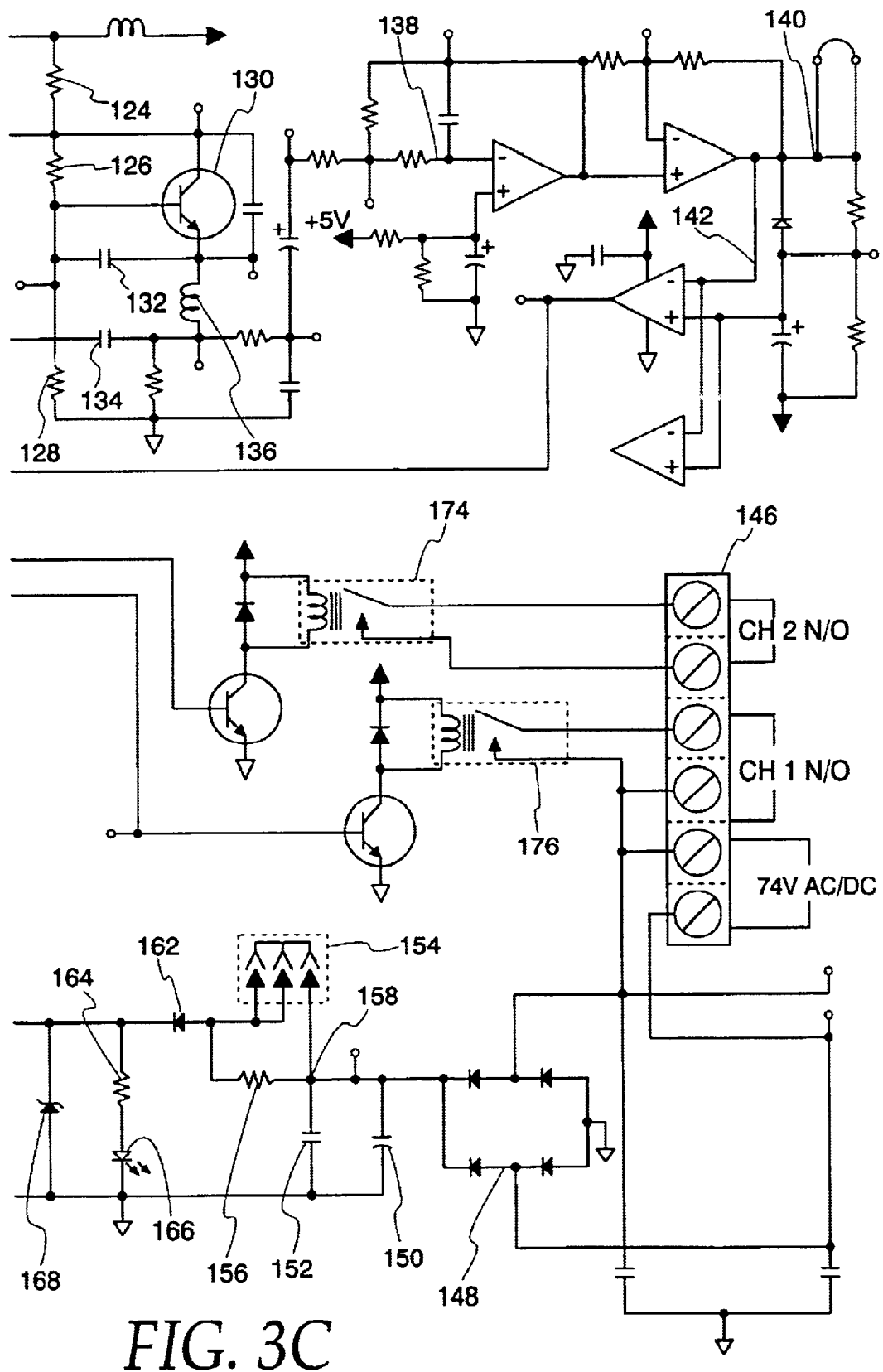

A schematic diagram of a receiver 50 capable of receiving a plurality of different codes at a plurality of different frequencies is shown in FIG. 3. RF antenna 100 is connected to front end matching antenna circuitry 102, and receives incoming analog RF signals. The front end matching antenna circuitry 102 is coupled to a low gain amplifier 104, which is in turn connected to a feedback loop 106 from a super regenerative amplifier. A tunable band pass filter 108 is connected to the feedback loop 106 and comprises a tunable inductor 110, capacitors 112 and 114, signal diode 116, capacitor 118, tunable capacitor 120, and inductor 122. The operation of tunable band pass filter 108 will be discussed further below. Resistors 124, 126 and 128 provide dc biasing for high gain super regenerative amplifier 130. Basically resistors 124, 126 and 128 control the operating range of super regenerative amplifier 130 and its operation at the dc biasing point. Capacitors 132 and 134, and inductor 136 are coupled to super regenerative amplifier 130 and control the quench rate of the amplifier (i.e., the on/off of the amplifier 130). The quench rate determines the base band bandwidth of the overall circuit.

A first stage active filter circuit 138 with a 2 kHz bandwidth (which is in the audio range) is coupled to the discrete logic controlling the quench rate. A second stage consisting of an envelope detector comparator circuit 140 is coupled to first stage active filter 138 and serves to clean-up any portion of the signal that was missed in the first stage. The last stage comprises a comparator logic circuit 142 which supplies a digital output to pin P32 of controller 144, (i.e., a logic high or low).

The power supply for the circuit is coupled to pins 4, 5, and 6 of terminal block 146 which supplies an AC or DC voltage. Diodes D4, D5, D6 and D7 make up a full wave bridge rectifier 148 which takes an AC waveform and rectifies it to DC. Capacitors 150 and 152 are coupled to the bridge rectifier 148 and filter out AC noise. A jumper 154 is provided to short out resistor 156 if the voltage at point 158 is 12V so that all 12V will go to the voltage regulator 160. If the voltage at point 158 is 24V, then resistor 156 is not shorted out and is used as a current limiter. Diode 162 serves as a blocker to ensure that only DC voltage is coming into the remainder of the power supply circuit. Resistor 164 is a current limiter for LED 166, which serves as a power supply indicator. If power present LED 166 will light up green. Zener diode 168 is used to ensure that the voltage coming into the voltage regulator 160 is not more than 12V. Capacitors 170 and 172 serve as noise filters, and voltage regulator 160 takes 12V in and outputs 5V. The 12V supply is used to control output relays 174 and 176 and the 5V supply is used for the logic circuit as logic high.

The software executing on the controller 144 (as will be discussed further in FIGS. 5A–G), sends out a logic high from pin 24 to multi-position switch 178, and reads back the input on pins 19, 20 and 21 of controller 144. This allows the controller 144 to determine the position of multi-position switch 178, thereby determining what code the controller is to look for as the receiver actuating signal, (i.e., manufacturer A's code, B's code, C's code, etc.). More particularly, pins 19, 20, and 21 of controller 144 are normally pulled low by pull down resistors 180. When the logic high is output from pin 24, one of pins 19, 20, or 21 will return a logic high thereby indicating that the setting of multi-position switch 178 corresponding to that pin has been selected.

Figure 4A:
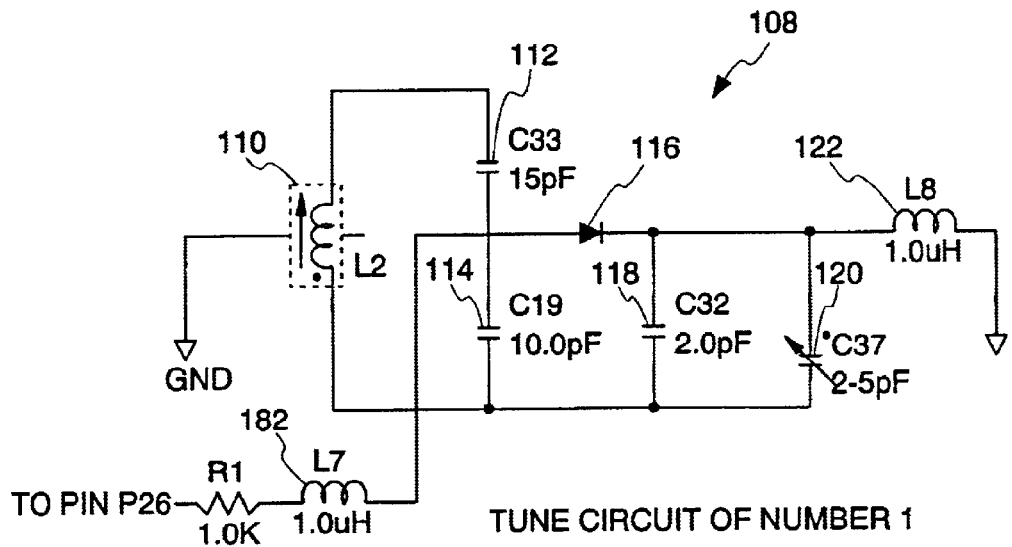
FIGS. 4A–B are schematic diagrams of the two possible tuning circuits shown in FIG. 2.
Figure 4B:
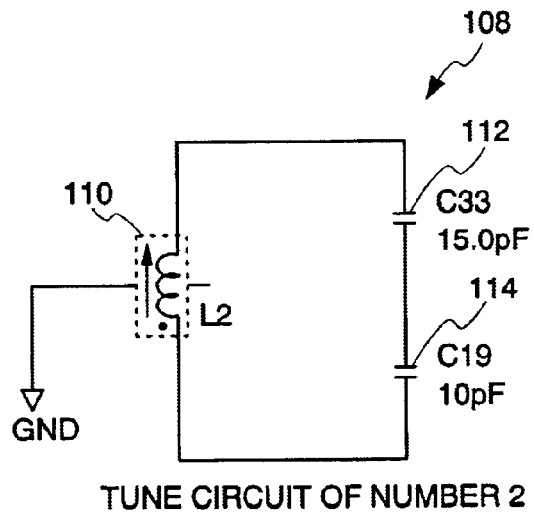

The controller will determine what frequency the tunable bandpass filter 108 should be set up to receive at based on the setting of multi-position switch 178. In the embodiment of FIG. 3, the bandpass filter circuitry 108 is set up to receive a frequency between the ranges of 280 MHz to 340 MHz, and is tuned to receive either a 300 MHz signal or a 310 MHz signal. Other components can be used to receive a different range of frequencies. Schematic diagrams of the two possible bandpass filter tuning circuits used in FIG. 3 are also shown in FIGS. 4A and B. To tune the bandpass filter 108 from one frequency to another, the controller 144 will either output a logic high from pin P25 or not. If pin P25 is set high, diode 116 is turned on (or becomes forward biased) and adds capacitors 118 and 120 in parallel to capacitor 114. The addition of capacitors 118 and 120 increases the overall capacitance tunable inductor 110 sees in the bandpass filter 108 and lowers the frequency to 300 MHz. This is true because capacitance affects frequency according to the equation $2\pi f = 1/(1/^2 |LC)$. Where f is the desired frequency, L is the inductance, and C is the equivalent capacitance. In FIGS. 3 and 4A–B, the L (or the inductance) is tunable inductor 110 and C (or the equivalent capacitance seen by inductor 110) is capacitor 112 in series with capacitor 118, which is in parallel with capacitors 118 and 120. Capacitor 118 increases the resolution of the tuning of tunable capacitor 120.

The inductor 182 serves to block any high frequency RF from coming in to and damaging the controller 144. This is so because the impedance of an inductor is approximately equal to the frequency times the inductance, so as the frequency gets higher so does the impedance and the inductor serves to block off the high frequency from coming into the microprocessor from the RF circuitry. The inductor 122 performs a similar function. Note that any undesirable RF frequency making it through the bandpass filter 108 is sent to ground rather than allowing such to travel throughout the circuit where it can potentially get amplified and cause the circuit to work improperly.

If pin P25 is set low, diode 116 is not tuned on (or is reverse biased) and the bandpass filter 108 comprises tunable inductor 110 and capacitor 112 in series with capacitor 114. The equivalent capacitance seen by inductor 110 is now smaller, therefore the frequency will increase. For example, if 310 MHz is the desired frequency for the tuning bandpass filter 108 shown in FIG. 3, diode 115 would be switched off so that the equivalent capacitance seen by inductor 110 is smaller. However, if 300 MHz is the desired frequency for the tuning bandpass filter 108, diode 115 would be switched on so that the equivalent capacitance seen by inductor 110 is larger. When diode 115 is turned off (or reverse biased), there is still a small amount of capacitance in parallel with capacitor 114. This is because diode 115 acts as a small capacitor when off (i.e., approximately 2–3 pF) in series with capacitors 118 and 120 in parallel. This fact must be taken into account when tuning the circuit to operate at different frequencies.

Therefore, diode 116 acts as a solid state switch controlled by controller 144 which switches in and/or out various discrete components in order to add or decrease the capacitance seen by inductor 110. By doing so, the bandpass filter 108 can be tuned to receive a variety of different frequencies. The equivalent capacitance seen by inductor 110 determines the center frequency of the receivers.

Once the controller 144 has determined what code is to be received and at what frequency, it determines whether the relay output should be momentary or continuous. This is accomplished by reading pins 05 and 06 which are connected to the output relay control jumpers 184 and 186. The position of the jumpers 184 and 174 determine whether momentary or continuous operation has been selected. If continuous operation has been selected, the receiver will output only as long as receiver actuation signals are received, (i.e., constant pressure on transmitter button must be applied to continue having the movable barrier move). However, if momentary operation has been selected, the receiver will output upon receipt of one receiver actuation signal, (i.e., one press must be applied to have the movable barrier open or close). Jumper 184 controls relay 174 output and jumper 186 controls relay 176 output.

After the relay output has been selected, the controller polls the pins connected to the configuration DIP switches 188 and 190 to determine what bit pattern an incoming signal must have before the receiver accepts it as an authorized receiver actuation signal. More particularly, the relay sets pin 23 of controller 144 high, sets the remaining output pins P22, P21, and P20 low, puts P24 into a high impedance mode (so it looks like an open circuit for purposes of input coming back to it) and reads the input of pins P00, P01, P02, P03, and P04 to determine the status of switches 1–5 of DIP switch 188. If a logic high is returned to the input pin, the switch associated with that pin is closed. If a logic zero is returned to the input pin, the switch associated with that pin is closed. In order to eliminate the problems associated with mechanical switch bouncing, vibration and/or noise, ten consecutive reads of the same data must be made before the controller accepts the input.

Once switches 1–5 of DIP switch 188 has been read, pin 22 of controller 144 is set high, the remaining outputs P23, P21, and P20 are set low, P24 is put into high impedance mode, and input pins P00, P01, P02, P03, and P04 are read to determine whether switches 6–10 of DIP switch 188 are open or closed, (i.e., whether logic ones or zeros are returned). This is repeated for DIP 190 such that pin 21 is set high for controller 144 to determine the position of switches 1–5 of DIP 190, and pin 20 is set high for controller 144 to determine the position of switches 6–10 of DIP 190.

Once all of these settings and readings have been made, the receiver 50 is ready to receive a plurality of different codes at a plurality of different frequencies. As discussed above, the switching from one frequency to another can easily be accomplished by turning on or off a signal diode. When on, the signal diode adds capacitance to the bandpass filter adjusting the frequency to some lower frequency. When the diode is off, the signal diode takes out the additional capacitance out of the bandpass filter adjusting the frequency back to the original or some higher frequency. Additional digital frequency control of a receiver can be achieved by adding signal diodes connected to additional frequency circuitry.

FIGS. 5A–G are flow charts of the software executing in controller 144. The main routine 200 of the software initializes the controller settings and will only be performed at the initial startup of the controller 144. In step 202, the I/O parameters of are set, telling the controller which pins are input and which pins are output. Specifically, pins P00–P04 are set as input pins for the DIP switch inputs. Pins P05–P06 are set as input pins for the relay mode inputs, and pins P20–P27 are set as inputs for the DIP switch logic controls. Pin P32 is set as an input for the RADIO_INTERUPT, and is special because it responds to rising edge and falling edge (not just logic highs or lows). Pins P34 and P35 are set as outputs to the relay output controls. The remaining unused I/O pins or ports are set as high impedance inputs, (meaning they look,like open circuit inputs). If the controller is not told what each pin is, it will default to an input and increase the risk that the controller will be damaged. In keeping with the examples used thus far, the software flowchart will be discussed as if only three possible manufacturer codes can be selected (A's, B's, or C's code) and A's code is an eight bit code transmitted at 310 MHz, B's code is a ten bit code transmitted at 300 MHz, and C's code is a ten bit code transmitted at 310 MHz.

In step 204, the interrupts priorities are set for the controller 144. There are two interrupts enabled in the software. The software jumps to a RADIO_INTERUPT located at. pin P32 whenever an signal edge is received. A down counter T0_INTERUPT is also used to help the controller keep track of timing. The interrupt priority is set so that RADIO_INTERUPT has a higher priority than the T0_INTERUPT. Step 204 also clears any previously stored interrupts. During this step, the controller also disables RADIO_INTERUPT and T0_INTERUPT.

Once this has been completed, the controller 144 sets the timer parameters. In step 206, the prescaler for T0 is set equal to 25, so that each count in T0 is 0.05 milliseconds (msec.). Down counter T0 is also set equal to 200. The equation the controller 144 uses to determine elapsed time is: T0=200−20*(time in msec.). T0 is the value stored in the down counter register, (which will decrease from 200 as more time passes).

In step 208, several variables are assigned a numeric value. For example, n is set equal to thirty, good packet is set equal to zero, and bit counter is set equal to one. N is the memory location where the time values saved when a signal edge is received are stored. After the main routine has finished initializing the controller 144, the controller jumps to the start routine 210.

The start routine 210 is where the controller reads the code and bit-pattern settings and adjusts the bandpass filter according to the frequency associated with the manufacturer code selected. In step 212, the control inputs (including the configuration switch and the relay mode output jumpers) are read. Specifically, input pins P01, P02 and P03 (which are coupled to the configuration multi-position switch) are read and saved in the CONTROL_INPUT register, identifying to the controller what manufacturer's code has been selected, (i.e., whether manufacturer A's, B's or C's code has been selected). The output relay mode jumper settings are also read and saved in the CONTROL_INPUT register, identifying to the controller whether the receiver output should be momentary or continuous.

In step 214, the controller sets the RF channel according to the configuration selection made. For example if the configuration switch indicates that manufacturer B's code has been selected, then pin P25 is set as a high output. This turns diode 116 on (forward biased) and causes the bandpass filter 108 to be set up for 300 MHz. If the configuration switch indicates that manufacturer A's or C's code has been selected, pin P25 is set as a high impedance input and diode 116 is turned off (reverse biased) causing the bandpass filter 108 to be set up for 310 MHz.

The DIP switches indicating what receiver actuation signal bit pattern has been selected are read in step 216. The inputs received from reading the DIP switches are saved in the DIP_SWITCH_ID register. If the configuration selection indicates manufacturer A's code has been selected, (which is an eight bit code), the last two bits (bits nine and ten) are cleared out of the DIP_SWITCH_ID register.

The controller then moves to step 218 and enables both the RADIO_INTERUPT and the T0_INTERUPT. So now, if an edge is received on pin P32, the controller software will jump to the RADIO_INTERUPT subroutine. (See FIG. 5G). If T0 ever times out, the software will jump to the T0_INTERUPT. If an signal edge is received simultaneously with a T0 time out, the RADIO_INTERUPT will take priority over the T0_INTERUPT. In step 218, the T0 timer begins counting down and the RADIO_INTERUPT is set to rising edge, so that upon receipt of the first rising edge, the software will jump to the RADIO_INTERUPT subroutine. Once this step is complete, the software jumps to the Program Loop routine 236.

Figure 5A:
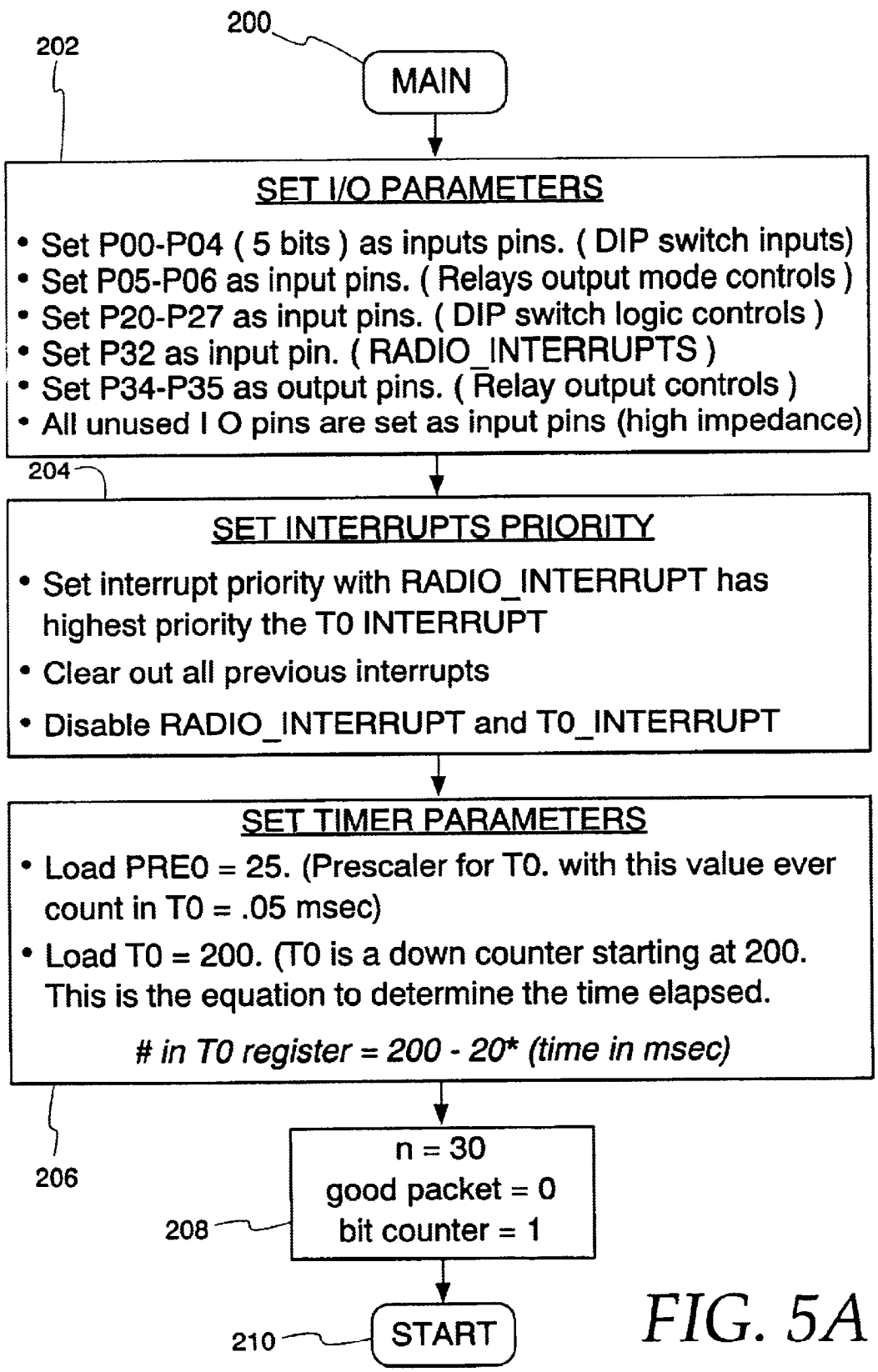
FIGS. 5A–G are flowcharts of the software operating within the controller depicted in FIG. 3.
Figure 5B:
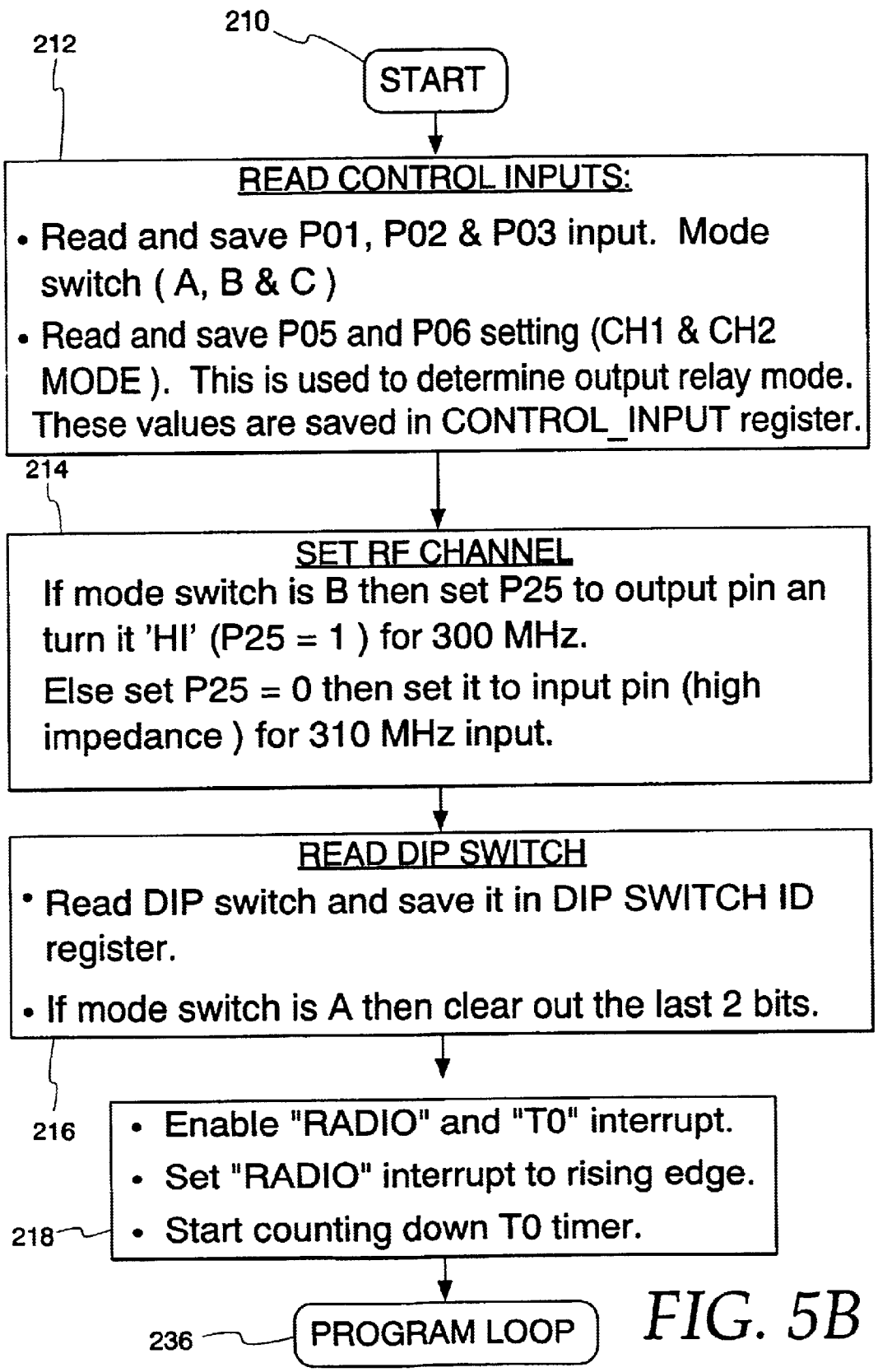
Figure 5C:
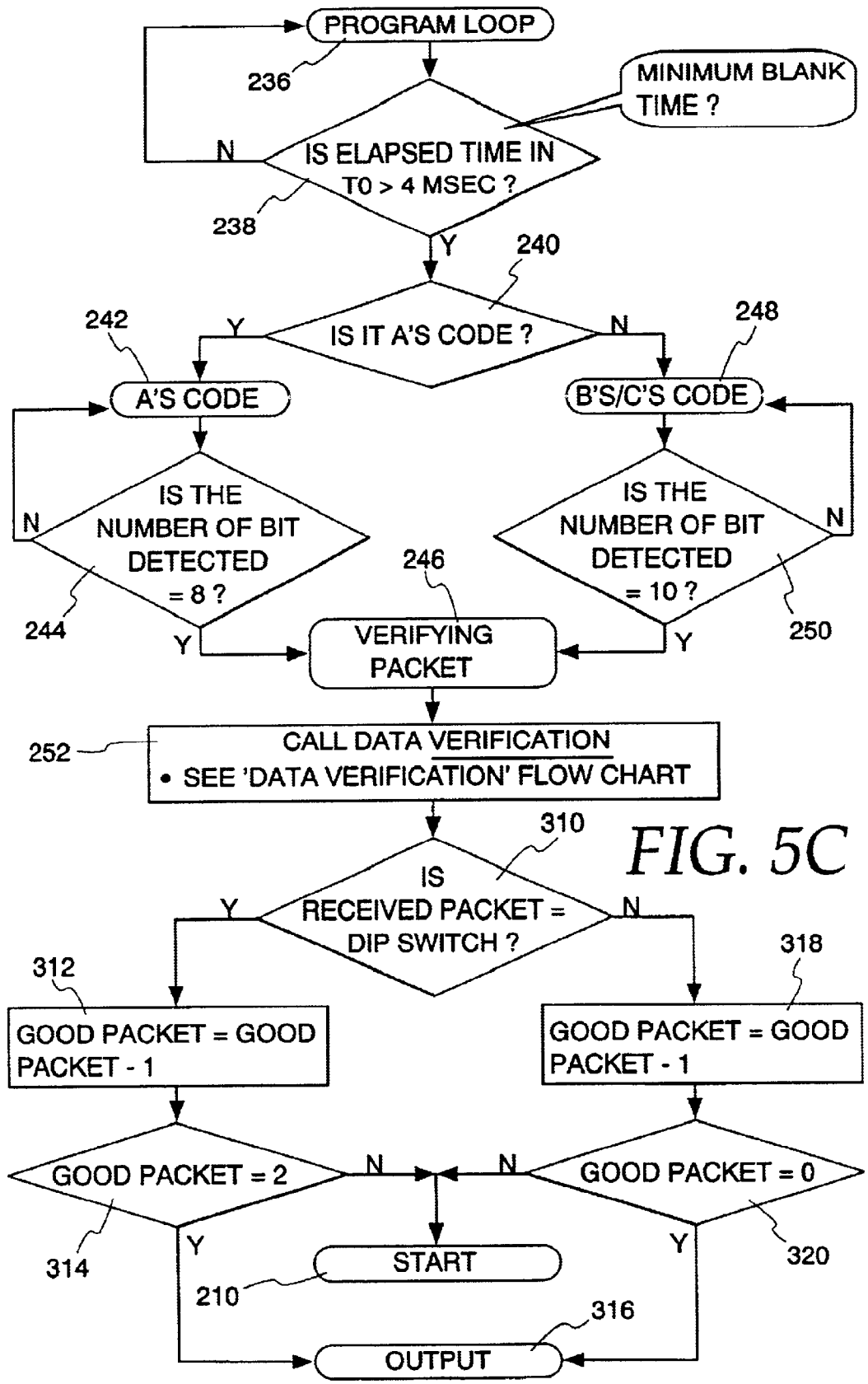
Figure 5D:
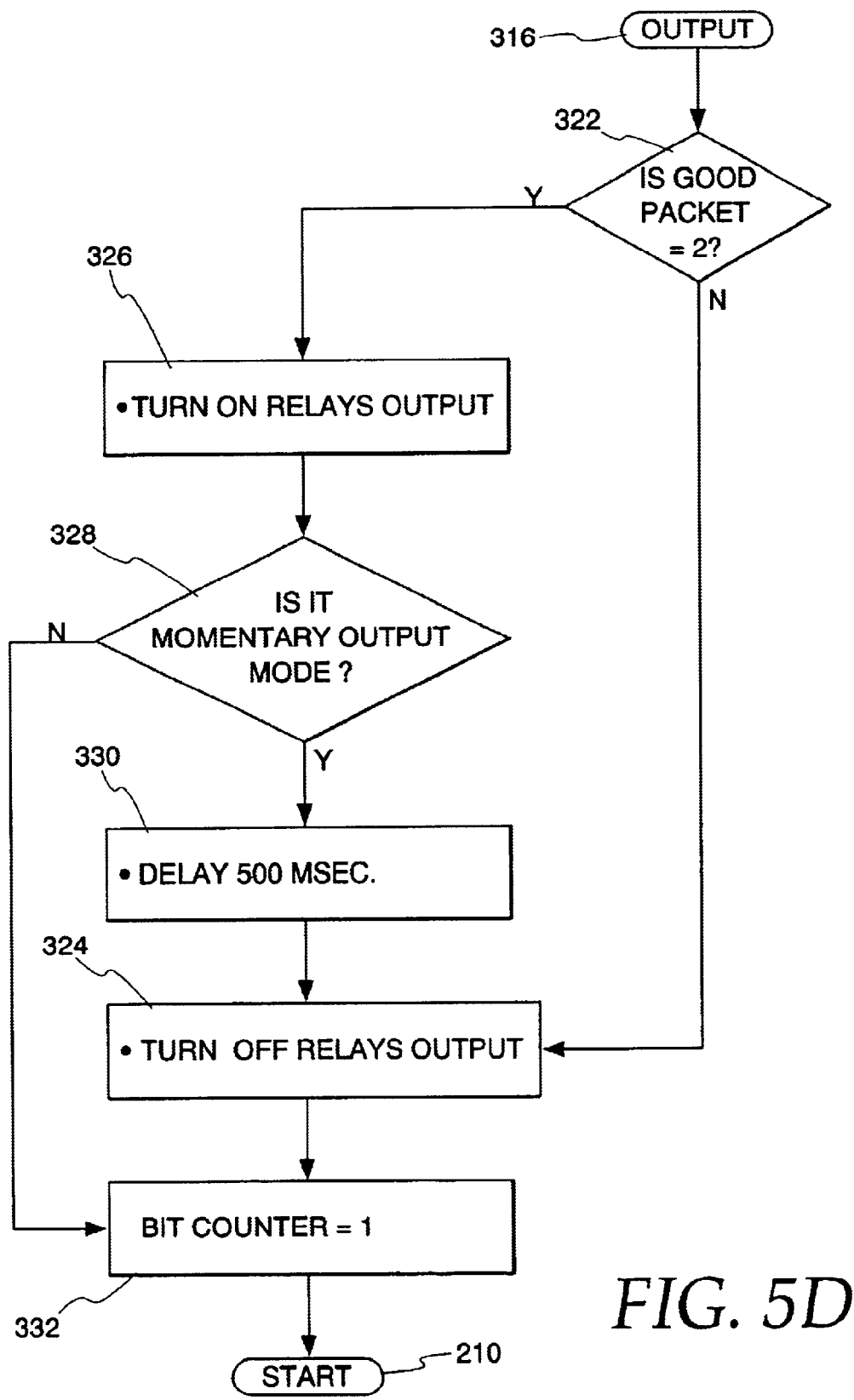
Figure 5E:
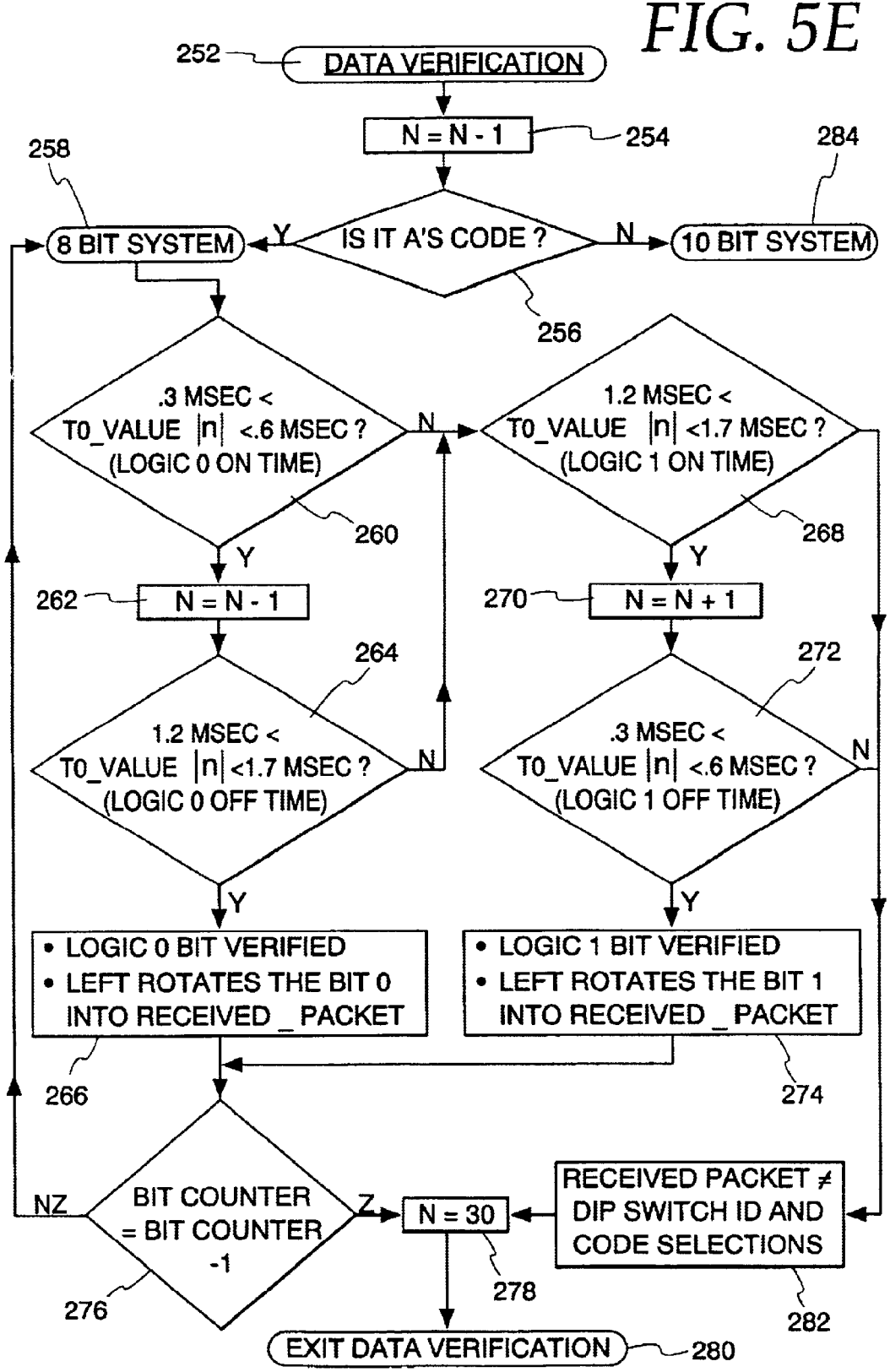
Figure 5F:
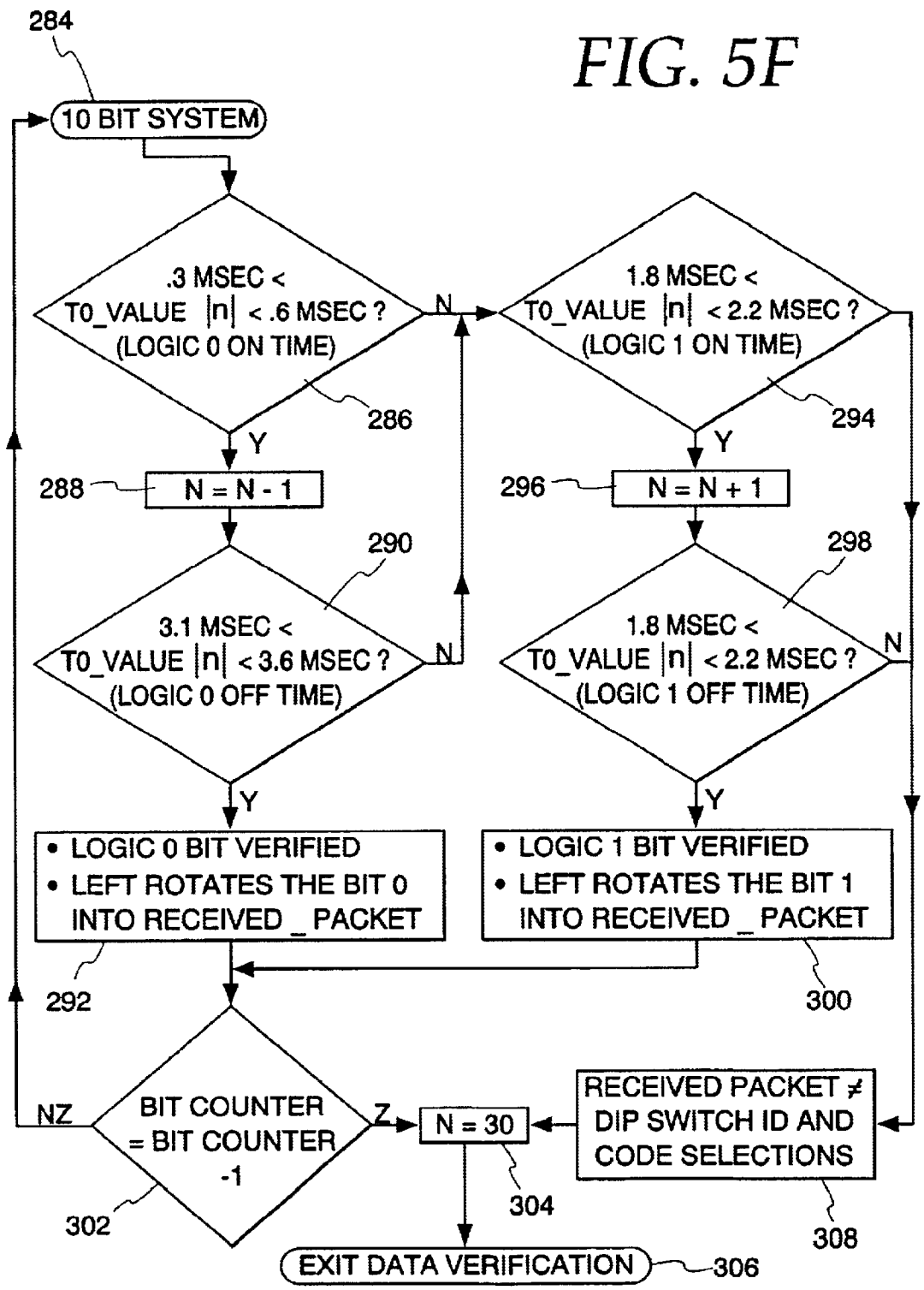
Figure 5G:
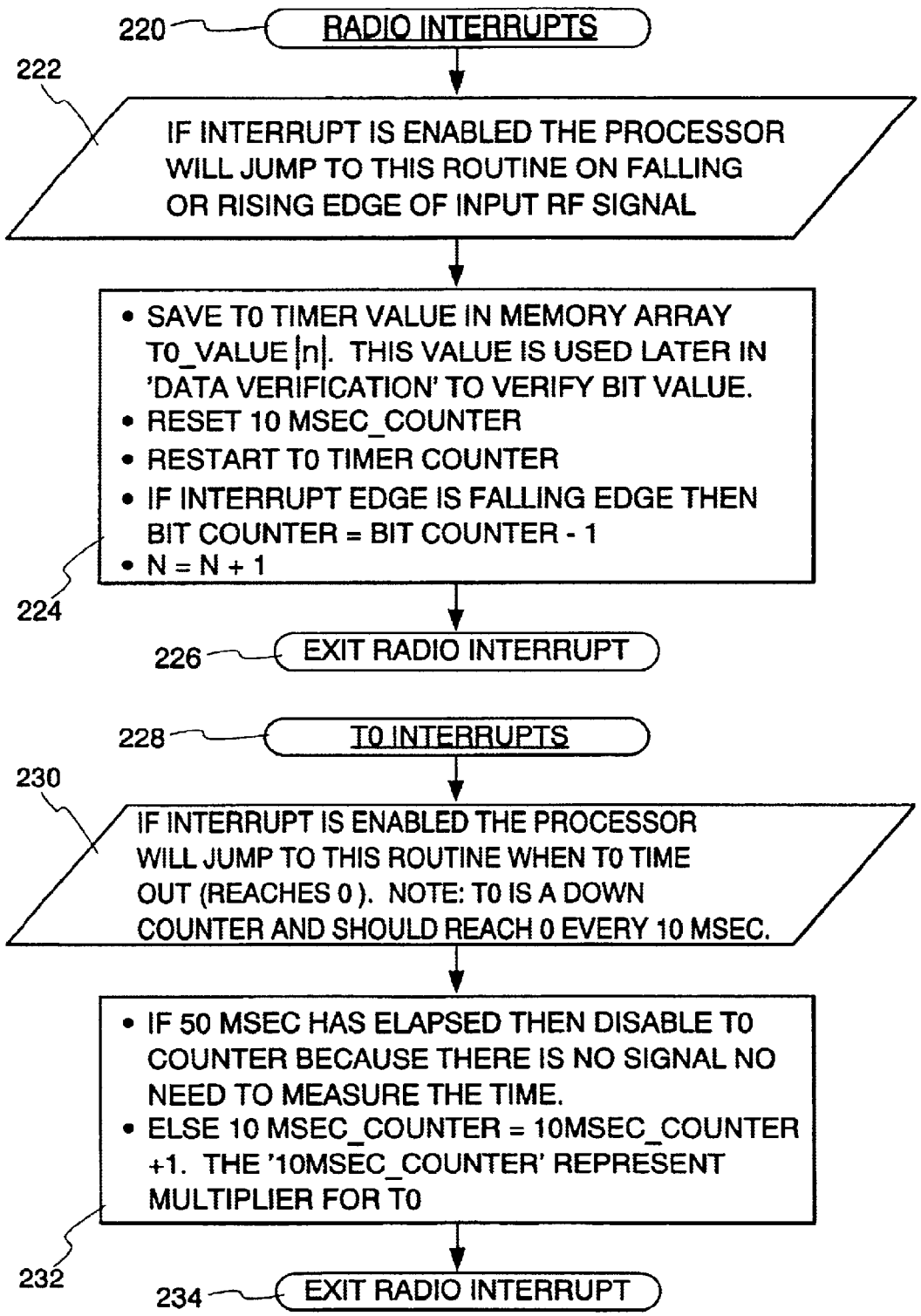

The RADIO_INTERUPT and T0_INTERUPT routines are show in FIG. 5G. The RADIO_INTERUPT routine 220 will be jumped to if a RF input falling edge or rising edge is detected, (as is indicated in step 222). This interrupt 220 saves the T0 timer values at the point the rising or falling edges are received and resets the T0 timer. These values allow the controller 144 to calculate what the pulse width time is, (i.e., time capturing of the digital signal). More particularly, the RADIO_INTERUPT routine 220 saves the T0 timer value at the time the rise/fall is received to memory array T0_VALUE[n]. This value will later used later on by the controller during the Data Verification subroutine. The RADIO_INTERUPT resets the 10 msec._counter, restarts the T0 timer counter, and toggles the radio edge interrupt. If a falling edge was detected the "bit counter" is set equal to "bit counter+1". The variable "n" is then set equal to "n+1", so that the next T0 value representing a rising/falling edge of a signal is stored in a different memory location, and the RADIO_INTERUPT routine 220 is exited.

The T0_INTERUPT 228 will be jumped to if the T0 timer times out (or reaches zero). If no radio interrupt is received, the T0 counter should reach zero every ten msec., (as is indicated in step 230). In step 232 the T0_INTERUPT disables the T0 counter if fifty msec. have elapsed without receiving a signal. If fifty msec. have not elapsed without a signal, but the T0 timer has timed out, the "10 msec._counter" is set equal to "10 msec._counter+1". The 10 msec._counter represents the multiplier for T0. Once the T0_INTERUPT is complete, the software exits the T0_INTERUPT routine 228.

In the Program Loop routine 236, the controller checks the T0 register to see if the elapsed time is greater than four msec. Four msec. represents the minimum amount of blank time. In step 238, if a received signal does not have four msec. of blank time, it is not a code we are looking for and is ignored. The controller will keep reading the T0 timer registers until a gap of four msec. has elapsed without any radio interrupts.

In step 240, the controller determines whether the code selected was manufacturer A's code (which is an eight bit code) or manufacturer B's or C's code. If A's code has been selected control shifts to step 242 and then to step 244 in which the number of bits received is determined. Since manufacturer A's code is an eight bit code, the controller waits until all eight bits have been received before moving on to packet verification step 246. The signal received from falling edge to falling edge is one bit. If eight bits have not been received, the controller continues to wait until all the bits have been received. If eight bits have been received, the entire packet has been received and the controller moves to step 246 packet verification.

If manufacturer A's code was not selected, manufacturer B's or C's code must have been selected (which are 10 bit codes), and the controller moves to step 248. In step 250, the controller asks whether ten bits have been received. If ten bits have not been received, the controller continues to wait for all the bits to be received. If ten bits have been received, the entire packet has been received and the controller moves to step 246 and begins verifying the packet.

Once the packet verification step 246 has been reached, the controller moves to step 248 and calls the Data Verification subroutine 252 which verifies the packet bit-by-bit. (See FIGS. 5E and F). In step 254 of the Data Verification subroutine 252, the variable "n" is set equal to "n+1" indicating, that we are moving to a new memory location. Then, in step 256, the controller determines whether manufacturer A's code has been selected. If A's code has been selected the controller moves to step 258 and 260. In step 260, the controller determines whether T0_VALUE [n] is greater than 0.3 msec. and smaller than 0.6 msec., (which is the first on-time pulse width or on time for manufacturer A's code). If T0_VALUE [n] is within these parameters, control moves to step 262 and "n" is set equal to "n+1" to move to the next memory location. After the value of "n" has been set, the controller moves to step 264 and determines whether T0_VALUE [n] is greater than 1.2 msec. and smaller than 1.7 msec. (which is the off time for manufacturer A's code). If T0_VALUE [n] is within these parameters, the controller moves to step 266, and rotates the zero bit into RECEIVED_PACKET shift register, (specifying that the logic zero bit has been verified).

If the T0_VALUE [n] does not meet the parameters set forth in steps 260 and/or 264, the controller moves to step 268 to determine if a logic one was received rather than a logic zero. In step 268, the controller determines whether T0_VALUE [n] is greater than 1.2 msec. and less than 1.7 msec. If T0_VALUE [n] falls within this parameter the controller moves to step 270 and sets "n" equal to "n+1", (or moves to the next memory location). Then the controller moves to step 272 and determines whether T0_VALUE [n] is greater than 0.3 msec. and less than 0.6 msec. If it is, the controller moves to step 274 and shifts or left rotates the one bit into the RECEIVED_PACKET shift register, (indicating that a logic one has been received).

Once the shift register has been updated by steps 266 and/or 274, the controller moves to step 276, setting "bit counter" equal to "bit counter–1" and determining whether "bit counter–1" is equal to zero. If "bit counter–1" does not equal zero, not all of the bits of the packet have been verified, so the controller goes back to step 258 and repeats this procedure with the next bit of the packet. If "bit counter–1" is equal to zero, the controller moves to step 278 and sets "n" back to thirty. Then the controller exits the data verification subroutine in step 280.

If the T0_VALUE [n] does not meet either of the parameters set forth in steps 268 and 272, the controller moves to step 280 and determines that the received packet does not match the receiver actuation signal selected by the three position switch input. Then the controller moves from step 282 to step 278, sets the value of "n" equal to thirty, and exits the data verification routine in step 280.

If the code determination in step 256 indicates that the code is not that of manufacturer A's, the controller moves to step 284 because a ten bit word has to verified. In step 286 the controller determines if the T0_VALUE [n] of the ten bit word is greater than 0.3 msec. and less than 0.6 msec. (which is the first on-time pulse width or on-time for manufacturer B and C's codes). If T0_VALUE [n] is within these parameters, control moves to step 288 and "n" is set equal to "n+1" to move to the next memory location. After the value of "n" has been set, the controller moves to step 290 and determines whether T0_VALUE [n] is greater than 3.1 msec. and smaller than 3.6 msec. (which is the off time for manufacturer B and C's code). If T0_VALUE [n] is within these parameters, the controller moves to step 292, and rotates the zero bit into the RECEIVED_PACKET shift register, (specifying that a logic zero bit has been verified for the ten bit word).

If the T0_VALUE [n] does not meet the parameters set forth in steps 286 or 290, the controller moves to step 294 to determine if a logic one was received rather than a logic zero. In step 294, the controller determines whether T0_VALUE [n] is greater than 1.8 msec. and less than 2.2 msec. If T0_VALUE [n] falls within this parameter the controller moves to step 296 and sets "n" equal to "n+1", (or moves to the next memory location). Then the controller moves to step 298 and determines whether T0_VALUE [n] is greater than 1.8 msec. and less than 2.2 msec. If it is, the controller moves to step 300 and shifts or left rotates the one bit into the RECEIVED_PACKET shift register, (indicating that a logic one has been received).

Once the shift register has been updated by steps 292 or 300, the controller moves to step 302, setting "bit counter" equal to "bit counter–1" and determining whether "bit counter–1" is equal to zero. If "bit counter–1" does not equal zero, not all of the bits of the packet have been verified, so the controller goes back to step 284 and repeats this procedure with the next bit of the packet until all ten bits have been received. If "bit counter–1" is equal to zero, the controller moves to step 304 and sets "n" back to thirty. Then the controller exits the data verification subroutine in step 306.

If the T0_VALUE [n] does not meet either of the parameters set forth in steps 294 or 298, the controller moves to step 308 and determines that the received packet does not match the receiver actuation signal selected by the three position switch inputs. Then the controller moves from step 308 to step 304, sets the value of "n" equal to thirty, and exits the data verification routine in step 306.

Once the packet has been verified through the verification subroutine 252, the controller moves to step 252 in the program loop 236, and determines whether the bit pattern of the received packet matches the bit pattern selected by the DIP switches 188 and 190. If it does match, the controller moves to step 312 and sets the variable "Good packet" equal to "Good packet+1". (This operation will not take place if Good packet is already equal to two.) The controller then moves to step 314 and determines if the new "Good packet" value equals two. If the "good packet" does not equal two, the controller moves back to the start routine 210 and test the packet over again to confirm whether it is a good or bad packet. The program needs two good packets in a row or two bad packets in a row before it is determined to be good or bad, (i.e., the controller won't throw out a packet based on the receipt of one error, but rather requires a confirmation of the fact the packet is either good or bad). If the "good packet" equals two, the controller moves to the output routine 316.

If the bit pattern of the received packet does not match the bit pattern selected by the DIP switches 188 and 190 in step 310, the controller moves to step 318 and sets the variable "Good packet" equal to "Good packet−1". (This operation will not take place if Good packet already equals zero.) Once the Good packet has been adjusted in step 310, the controller moves to step 320 and determines if the Good packet variable equals zero. If the Good packet variable equals zero, the controller has confirmed that the received packet does not match the selected receiver actuation signal input settings and moves to the output routine 316. If the Good packet variable does not equal zero, the controller moves back to the start routine 210 and test the packet all over again to confirm whether it is a good or bad packet.

The output routine 316 (FIG. 5D) begins with step 322 and the controller asking whether the "Good packet" is equal to two. If the Good packet is not equal to two, the received signal does not match the receiver actuation signal input selections, and the controller moves to step 324 and shuts off the receiver's relay output (if on). The controller sets the "Bit counter" equal to one and returns to the start routine 210 to begin receiving a new signal. If the Good packet equals two in step 322, the controller moves to step 326 and turns on the receiver's relay output. Then the controller moves to step 328 and determines if the momentary output mode was selected earlier. If momentary output was not selected, the controller moves to step 332 and sets the Bit counter equal to 1. If momentary output was selected, the controller moves to step 330 and enables a 500 msec. delay. Then the controller moves to step 324 and turns off the receiver relay output. After step 324, the controller moves to step 332 to set the "Bit counter" equal to one and returns to the start routine 210 to receive a new signal. The reason for setting the bit counter to one is so that the controller will know the next bit received is from a new word. A listing of the software executing on the controller is attached in an Appendix hereto, (A1–A12).

Thus it is apparent that there has been provided, in accordance with the invention, a method and apparatus for receiving a plurality of codes at a plurality of different frequencies that fully satisfies the objects, aims, and advantages set forth above. While the invention has been described in conjunction with specific embodiments and methods thereof, it is evident that many alternatives, modification, and variations will be apparent to those skilled in the art in light of the foregoing description. Accordingly, it is intended to embrace all such alternatives, modifications, and variations as fall within the spirit and broad scope of the appended claims.

What is claimed is:

1. A receiver capable of receiving a plurality of different codes at a plurality of different frequencies, comprising:

an input device for selection among a plurality of different codes and a plurality of different bit patterns wherein at least some of the plurality of different bit patterns differ from one another with respect to packet length;

an antenna for receiving a receiver actuation signal;

digital frequency control circuitry;

a controller for comparing said received receiver actuation signal to said code and bit pattern selections; and output circuitry for responding to the receipt of a receiver actuation signal that matches said code and bit pattern selections.

2. The receiver of claim 1 wherein said digital frequency control circuitry comprises a signal diode capable of adding and removing discrete components from a bandpass filter.

3. The receiver of claim 2 wherein said input device for selecting among a plurality of different codes is a multi-position switch.

4. The receiver of claim 2 wherein said input device for selecting among a plurality of different bit patterns is a DIP switch.

5. A super-regenerative receiver capable of receiving a plurality of different codes at a plurality of different frequencies, comprising:

an input device for selection among a plurality of different codes and a plurality of different bit patterns wherein at least some of the plurality of different bit patterns differ from one another with respect to packet length;

an antenna for receiving a receiver actuation signal;

digital frequency control circuitry;

a controller for comparing said received receiver actuation signal to said code and bit pattern selections; and output circuitry for responding to the receipt of a receiver actuation signal that matches said code and bit pattern selections.

6. A radio frequency receiver for receiving a plurality of actuation signals from a movable barrier operator transmitter, each receiver being capable of receiving a plurality of coded signals comprising:

a plurality of different codes; and different bit patterns wherein at least some of the bit patterns differ from one another with respect to packet length;

at a plurality of different frequencies, comprising:

first and second user-selectable input devices for selecting a specified code and a specified bit pattern for receiving said actuation signals;

a controller coupled to said input devices for processing said code and bit pattern selections and outputting data responsive to said input; and receiver circuitry responsive to said controller output data for receiving particular actuation signals at one frequency and receiving particular other actuation signals at another frequency.

7. The radio frequency receiver of claim 6, wherein said first user-selectable input device comprises a multi-position switch which determines a particular code to be received as said actuation signal based upon the position of said multi-positioned switch.

8. The radio frequency receiver of claim 7, wherein said second user-selectable input device comprises a dual in-line packaged switch having a plurality of inner switches which determine a particular bit sequence to be received as said actuation signal based upon the position of said plurality of inner switches.

9. The radio frequency receiver of claim 8, wherein said controller processes the code and bit sequence selections from said input devices and outputs data according to said input to said receiver circuitry causing said receiver circuitry to receive particular data at one frequency and other data at another frequency.

* * * * *

UNITED STATES PATENT AND TRADEMARK OFFICE
CERTIFICATE OF CORRECTION

PATENT NO. : 6,915,146 B1
DATED : July 5, 2005
INVENTOR(S) : Nguyen et al.

It is certified that error appears in the above-identified patent and that said Letters Patent is hereby corrected as shown below:

<u>Title page,</u>
Item [75], Inventor, change "Bernard Wojciak" to -- Bernard Wojciak, Jr. --.

Signed and Sealed this

Twentieth Day of September, 2005

JON W. DUDAS
*Director of the United States Patent and Trademark Office*